(12) United States Patent
Jeong et al.

(10) Patent No.: US 12,111,145 B2
(45) Date of Patent: Oct. 8, 2024

(54) BLASTING DESIGN DEVICE, BLASTING SYSTEM AND OPERATION METHOD OF SAME

(71) Applicant: HANWHA CORPORATION, Seoul (KR)

(72) Inventors: Min Su Jeong, Seongnam-si (KR); Dong Hee Lee, Seongnam-si (KR); Seung Joong Lee, Seongnam-si (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 17/623,479

(22) PCT Filed: Dec. 21, 2021

(86) PCT No.: PCT/KR2021/019498
§ 371 (c)(1),
(2) Date: Dec. 28, 2021

(87) PCT Pub. No.: WO2023/120760
PCT Pub. Date: Jun. 29, 2023

(65) Prior Publication Data
US 2024/0044628 A1     Feb. 8, 2024

(51) Int. Cl.
*F42D 1/045* (2006.01)
*B64U 20/00* (2023.01)
(Continued)

(52) U.S. Cl.
CPC ............. *F42D 1/045* (2013.01); *B64U 20/00* (2023.01); *F42D 3/04* (2013.01); *B64U 2101/32* (2023.01)

(58) Field of Classification Search
CPC . F42D 1/045; F42D 1/05; F42D 1/055; F42D 1/06; F42D 3/04
(Continued)

(56) References Cited

U.S. PATENT DOCUMENTS

2020/0250355 A1* 8/2020 Giltner .................. G06Q 50/02

FOREIGN PATENT DOCUMENTS

| CA | 2982284 A1 * | 4/2018 | .......... B25J 11/0025 |
| KR | 100312528 B1 * | 11/2001 | ............... F42D 1/00 |

(Continued)

OTHER PUBLICATIONS

KR 2018-0075939 (Year: 2018).*
KR 10-0312528 (Year: 2001).*

*Primary Examiner* — Bret Hayes
(74) *Attorney, Agent, or Firm* — WHDA, LLP

(57) ABSTRACT

An operation method of the blasting system according to the embodiments includes: generating a blasting design including at least one of blasting hole information, explosive information and detonator information based on a base map for a blasting site; forming a plurality of blasting holes based on the blasting design, and complementing the blasting design according to drilling data generated by the drilling device; charging at least one of an explosive and an electronic detonator into the blasting holes based on the blasting design, and complementing the blasting design according to charging data generated by the charging device; and performing a detonator setting on a plurality of electronic detonators corresponding to the blasting holes based on the blasting design, and complementing the blasting design according to setting data generated by the detonator setting device.

20 Claims, 18 Drawing Sheets

(51) Int. Cl.
*F42D 3/04* (2006.01)
*B64U 101/32* (2023.01)
(58) Field of Classification Search
USPC .......................................................... 102/301
See application file for complete search history.

(56) References Cited

FOREIGN PATENT DOCUMENTS

| KR | 10-2018-0075939 A | | 7/2018 | |
|---|---|---|---|---|
| KR | 20180075939 A | * | 7/2018 | ............... F42D 3/00 |
| KR | 10-2079762 B1 | | 2/2020 | |
| WO | WO-2016077848 A2 | * | 5/2016 | ............. F42D 1/055 |
| WO | WO-2020028951 A1 | * | 2/2020 | ........... E21B 47/003 |
| WO | WO-2020138783 A1 | * | 7/2020 | ............ E04G 23/08 |
| WO | WO-2020263193 A1 | * | 12/2020 | ........... B64C 39/024 |

* cited by examiner

BLASTING DESIGN DEVICE, BLASTING SYSTEM AND OPERATION METHOD OF SAME

TECHNICAL FIELD

An embodiment of the present invention relates to a blasting system and an operation method of the same, and more particularly, to a blasting design device, a blasting system and an operation method of the same to establish a blasting plan, perform blasting based on the blasting plan, and analyze the blasting results.

BACKGROUND ART

In general, a blasting system for exploding and collapsing an object by using explosives has been used in the construction field such as blasting of bedrock, blasting of abandoned buildings, and outdoor blasting.

Specifically, a region or object to be blasted is divided into a plurality of sections, and a plurality of blasting holes into which explosives are inserted are formed for each section. The explosives are loaded into the drilled blasting holes, respectively, and then connected to a blasting device. When the detonators positioned in the blasting holes are detonated, the explosives are detonated and the object to be blasted is exploded and collapsed.

In regard to operations of the above blasting system, in the related art, each process has been performed by a human directly or by a human-manipulated machine. However, there is a possibility that an error may be caused by the human in the conventional blasting system. In addition, due to the error, the blasting result of the blasting system may not satisfy the required conditions (such as blasting degree, scale, crushing degree, vibration, and noise).

(Patent Document 1) US Patent Publication No. 2020-0217194 'EFFICIENT BLAST DESIGN FACILITATION SYSTEMS AND METHODS' (Published on Jul. 9, 2020)

(Patent Document 2) US Patent Publication No. 2020-0250355 'SYSTEMS FOR AUTOMATED BLAST DESIGN PLANNING AND METHODS RELATED THERETO' (Published on Aug. 6, 2020)

(Patent Document 3) US Patent Publication No. 2019-0293400 'System and Method for Controlling a Drill and Blast Event' (Published on Sep. 26, 2019)

DISCLOSURE

Technical Problem

The present invention provides a blasting design device, a blasting system and an operation method of the same to perform blasting based on a blasting plan and analyze the blasting results.

The present invention further provides a blasting design device, a blasting system and an operation method of the same to perform blasting using a wireless communication network by providing a private communication network.

The present invention further provides a blasting design device, a blasting system and an operation method of the same to generate a three-dimensional topographical model for a blasting site by using a drone and a laser radar for providing a topographical information service of the blasting site, and perform a blasting design more precisely by using the three-dimensional model.

The present invention further provides a blasting design device, a blasting system and an operation method of the same to precisely design drilling and blasting based on drilling data according to drilling of blasting holes.

The present invention further provides a blasting design device, a blasting system and an operation method of the same to precisely design charging and blasting based on charging data according to an explosive charging.

The present invention further provides a blasting design device, a blasting system and an operation method of the same to precisely set a detonator and design blasting based on setting data according to detonator setting.

The present invention further provides a blasting design device, a blasting system and an operation method of the same to improve the blasting effect by outputting the optimal blasting pattern using artificial intelligence, big data and machine learning technology.

The present invention further provides a blasting design device, a blasting system and an operation method of the same to check a blasting site (such as blasting equipment, blasting personnel, and working hours) in real time using a web service, and store blasting-related data in a cloud storage server.

The present invention further provides a blasting design device, a blasting system and an operation method of the same to output the optimal blasting pattern by detecting and analyzing at least one of vibration, noise and crushing degree according to blasting.

Technical Solution

The operation method of the blasting system according to the embodiments of the present invention includes: generating, by a blasting design device, a blasting design including at least one of blasting hole information, explosive information and detonator information, based on a base map for a blasting site; forming, by a drilling device, a plurality of blasting holes based on the blasting design, and complementing, by the blasting design device, the blasting design according to drilling data generated by the drilling device; charging, by a charging device, at least one of an explosive and an electronic detonator into the blasting holes based on the blasting design, and complementing, by the blasting design device, the blasting design according to charging data generated by the charging device; and performing, by a detonator setting device, a detonator setting on a plurality of electronic detonators corresponding to the blasting holes based on the blasting design, and complementing, by the blasting design device, the blasting design according to setting data generated by the detonator setting device, wherein the blasting hole information includes at least one of a position, depth, charging amount, and blasting hole spacing for the blasting holes, the explosive information includes at least one of energy density change, composition ratio, and specific gravity according to charging amount, charging length, type, and depth, and the detonator information includes at least one of type, position, initial time, and delay time of the electronic detonator.

The method according to the present invention may further include: surveying, by a surveying device, the blasting site, and generating, by the blasting design device, a base map according to survey data generated by the surveying device, wherein the generating of the base map includes: generating, by an unmanned aerial vehicle, first survey data by three-dimensionally surveying the blasting site in the air; generating, by a radar, second survey data by three-dimensionally surveying the blasting site on the ground; and generating, by the blasting design device, the base map, which is a three-dimensional topographical model based on at least one of the first survey data and the second survey data received from the unmanned aerial vehicle and the radar.

According to the present invention, the complementing of the blasting design according to the drilling data by the blasting design device may include: forming, by a drilling unit, at least one of the blasting holes according to the blasting hole information; generating, by a drilling detection unit, the drilling data by detecting at least one of positions, depths, and slopes of the blasting holes during forming at least one of the blasting holes; and complementing in real time at least one of the blasting hole information, the explosive information, and the detonator information included in the blasting design, by a first design complementation unit of the blasting design device and based on the drilling data.

According to the present invention, the complementing of the blasting design according to the charging data by the blasting design device may include: charging, by a charging unit, at least one of the explosive and the electronic detonator into at least one of the blasting holes according to the explosive information; generating, by the charge detection unit, the charging data by detecting at least one of energy density change, composition ratio, and specific gravity according to charging amount, charging length, type, and depth during charging at least one of the explosive and the electronic detonator; and complementing in real time at least one of the explosive information and the detonator information included in the blasting design, by a second design complementation unit of the blasting design device and based on the charging data.

According to the present invention, the complementing of the blasting design according to the setting data by the blasting design device may include: setting, by a setting unit, an initial time and a delay time for the electronic detonator according to the detonator information; generating, by a setting detection unit, the setting data by detecting at least one of a position, a type, an identification code, and a detonation energy of the electronic detonator; and complementing in real time the detonator information included in the blasting design, by a third design complementation unit of the blasting design device and based on the setting data.

According to the present invention, the method may further include: performing, by a blasting device, blasting according to the blasting design wherein the performing of the blasting according to the blasting design by the blasting device may include: transmitting, by the blasting device, a blasting command to the electronic detonators according to the detonator information; and detonating, by the electronic detonators, according to the blasting command to explode the explosive.

According to the present invention, the method may further include: monitoring, by a monitoring device, a situation of the blasting site in real time, wherein the situation of the blasting site may include a position and an operating status of at least one of the surveying device, the drilling device, the charging device and the detonator setting device, or a position and a route of an operator.

According to the present invention, the monitoring in real time by the monitoring device may include: monitoring by a processing unit, an entire blasting process in real time; providing, by a web providing unit, a monitoring result of the processing unit in real time through a web; and storing, by a storage unit, the monitoring result in a cloud server.

According to the present invention, the method may further include: detecting, by a blasting detection device, a blasting result by detecting at least one of vibration, noise and crushing degree according to the blasting; and analyzing, by the monitoring device, the blasting result and building a database based on the analyzed result.

According to the present invention, the detecting of the blasting result by the blasting detection device may further include: generating, by a vibration detection unit, vibration data by detecting the vibration generated according to the blasting; generating, by a noise detection unit, noise data by detecting the noise generated according to the blasting; and generating, by a crushing degree detection unit, crushing degree data by detecting a crushing degree of rock according to the blasting, wherein the crushing degree detection unit may photograph crushed stone using a drone for topographical production in a unit blasting region after the blasting, and perform a crushing degree analysis by processing an image of the crashed stone as an ortho-image.

The blasting design device according to the embodiments of the present invention includes: a blasting design unit for generating a blasting design including at least one of blasting hole information, explosive information and detonator information, based on a base map; and a first design complementation unit for complementing at least one of the blasting hole information, the explosive information, and the detonator information according to drilling data generated by a drilling device, wherein the blasting hole information may include at least one of a position, depth, a charging amount, and a blasting hole spacing for a plurality of blasting holes, the explosive information may include at least one of energy density change, composition ratio, and specific gravity according to charging amount, charging length, type, and depth, the detonator information may include at least one of type, position, initial time, and delay time of the electronic detonator.

According to the present invention, the blasting design device may further include: a map generation unit for generating the base map according to the survey data generated by the surveying device surveying the blasting site.

According to the present invention, the blasting design device may further include: a second design complementation unit for complementing at least one of the explosive information and the detonator information according to the charging data generated by the charging device.

According to the present invention, the blasting design device may further include: a third design complementation unit for complementing the detonator information according to setting data generated by the detonator setting device.

The blasting system according to the embodiments of the present invention includes: a surveying device for surveying the blasting site to generate survey data; a blasting design device for generating a blasting design for the blasting site; a drilling device for generating drilling data by forming a plurality of blasting holes based on the blasting design, and detecting at least one of positions, depths, and slopes of the blasting holes during forming at least one of the blasting holes; a charging device for generating charging data by charging at least one of an explosive and an electronic detonator into the blasting holes based on the blasting design, and detecting at least one of energy density change, composition ratio, and specific gravity according to charging amount, charging length, type, and depth during charging at least one of the explosive and the electronic detonator; and a detonator setting device for generating setting data by setting an initial time and a delay time for the electronic detonator based on the blasting design, and detecting at least one of a position, a type, an identification code, and a detonation energy of the electronic detonator, wherein the blasting design device includes: a map generation unit for generating a base map according to the survey data a blasting design unit far generating a blasting design including at least one of blasting hole information, explosive information and detonator information, based on the base map; and a first design complementation unit for complementing at least one of the blasting hole information, the explosive information, and the detonator information according to the drilling data, wherein the blasting hole information includes at least one of a position, depth, a charging amount, and a blasting hole spacing for a plurality of blasting holes, the explosive information includes at least one of energy density change, composition ratio, and specific gravity according to charging amount, charging length, type, and depth, and the detonator information includes at least one of type, position, initial time, and delay time of the electronic detonator.

According to the present invention, the blasting design device may further include: a second design complementation unit for complementing at least one of the explosive information and the detonator information according to the charging data generated by the charging device.

According to the present invention, the blasting design device may further include: a third design complementation unit for complementing the detonator information according to setting data generated by the detonator setting device.

According to the present invention, the blasting system may further include: a blasting device for performing the blasting according to the blasting design; and a monitoring device for monitoring a situation of the blasting site in real time, wherein the situation of the blasting site may include: a position and an operating status of at least one of the surveying device, the drilling device, and the charging device, or a position and a route of an operator.

According to the present invention, the monitoring device may include: a processing unit for monitoring the entire blasting process in real time; a web providing unit for providing a monitoring result of the processing unit in real time through a web; and a storage unit for storing the monitoring result in a cloud server.

According to the present invention, the surveying device may include: an unmanned aerial vehicle for three-dimensionally surveying the blasting site in the air; and a radar for three-dimensionally surveying the blasting site on the ground.

Advantageous Effects

According to the blasting design device, the blasting system and the operation method of the same of the present invention, the blasting can be performed based on a blasting plan and the blasting results can be analyzed.

In addition, according to the blasting design device, the blasting system and the operation method of the same of the present invention, the blasting can be performed using a wireless communication network by providing a private communication network.

In addition, according to the blasting design device, the blasting system and the operation method of the same of the present invention, the three-dimensional topographical model for a blasting site can be formed by using a drone and a laser radar for providing a topographical information service of the blasting site, and the blasting design can be performed more precisely by using the three-dimensional model.

In addition, according to the blasting design device, the blasting system and the operation method of the same of the present invention, the drilling and blasting can be precisely designed based on drilling data according to drilling of blasting holes.

In addition, according to the blasting design device, the blasting system and the operation method of the same of the present invention, the charging and blasting can be precisely design based on charging data according to an explosive charging.

In addition, according to the blasting design device, the blasting system the operation method of the same of the present invention, the detonator can be precisely set and the blasting can be precisely designed based on setting data according to detonator setting.

In addition, according to the blasting design device, the blasting system and the operation method of the same of the present invention, the optimal blasting pattern can be outputted using artificial intelligence, big data and machine learning technology, so that the blasting effect can be improved.

In addition, according to the blasting design device, the blasting system and the operation method of the same of the present invention, the blasting site (such as blasting equipment, blasting personnel, and working hours) can be checked in real time using a web service, and the blasting-related data can be stored in a cloud storage server.

In addition, according to the blasting design device, the blasting system and the operation method of the same of the present invention, the optimal blasting pattern can be outputted by detecting and analyzing at least one of vibration, noise and crushing degree according to blasting.

DESCRIPTION OF REFERENCE NUMERALS

Figure 1:
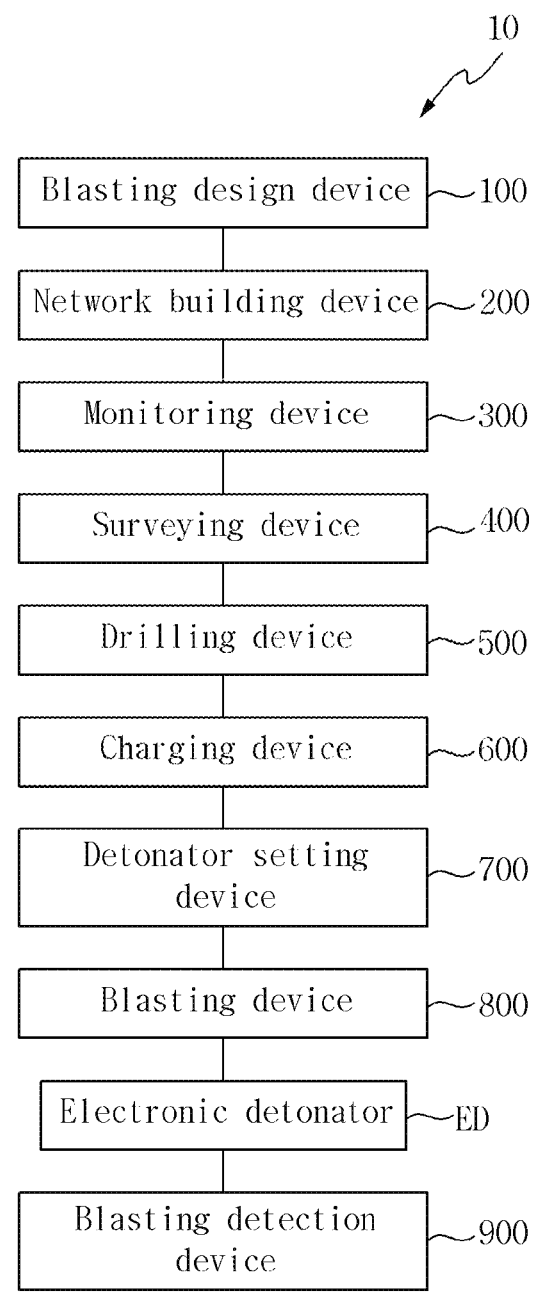
FIG. 1 is a view showing a blasting system according to the embodiments of the present invention.

| | |
|---|---|
| 10: Blasting System | 100: Blasting design device |
| 200: Network building device | 300: Monitoring device |
| 310: Processing unit | 320: Web providing unit |
| 330: Storage unit | 340: Database |
| 400: Surveying device | 410: Aerial vehicle |
| 420: Radar | 500: Drilling device |
| 510: Drilling unit | 520: Drilling detection unit |
| 600: Charging device | 610: Charging unit |
| 620: Charging detection unit | 700: Detonator setting device |
| 710: Setting unit | 720: Setting detection unit |
| 800: Blasting device | ED: Electronic detonator |
| 900: Blasting detection device | 910: Vibration detection unit |
| 920: Noise detection unit | 930: Crushing degree detection unit |

BEST MODE

The present invention will be described in more detail.

Hereinafter, the embodiments of the present invention and other matters necessary for those skilled in the art to easily understand the contents of the present invention will be described in detail with reference to the accompanying drawings. However, since the present invention may be embodied in various different forms within the scope set forth in the claims, the embodiments described below are merely exemplary regardless of the expression thereof.

The same reference numeral refers to the same element. Further, in drawings, the thicknesses, proportions, and dimensions of the elements may be exaggerated for the effective description of technical contents. The team. "and/or" may include any of one or more combinations that may be defined by associated configurations.

Although the terms such as first and second may be used to describe various elements, the above elements will not be limited by the above terms. The terms are used only for the purpose of distinguishing one element from another element. For example, the first element may be referred to as the second element without departing from the scope of the present invention, and similarly, the second element may also be referred to as the first element. The singular expression may include a plural expression unless the context clearly means otherwise.

In addition, the terms such as "under", "below", "over" and "above" are used to describe the relationship of the configurations shown in the drawings. The above terms are relative, and will be described based on the directions indicated in the drawings.

It will be understood that the term such as "include" or "have" is intended to designate the presence of feature, number, step, operation, element, component, or a combination thereof recited in the specification, which does not preclude the possibility of the presence or addition of one or more other features, numbers, steps, elements, components, or combinations thereof.

In other words, the present invention is not limited to the embodiments disclosed as below and may be implemented in various different forms. When a part is connected to the other part, the above expression may include not only directly connected but also electrically connected in which another element is interposed therebetween. In addition, it will be noted that the same elements in the drawings are denoted by the same reference numerals and reference symbols as much as possible even when indicated in different drawings.

FIG. 1 is a view showing a blasting system 10 according to the embodiments the present invention, Referring to FIG. 1, the blasting system 10 may generate a blasting design, and may complement the blasting design based on data detected in real time while performing blasting according to the blasting design. To this end, the blasting system 10 of the present invention may include a blasting design device 100, a network building device 200, a monitoring device 300, a surveying device 400, a drilling device 500, a charging device 600, a detonator setting device 700, a blasting device 800, and a blasting detection device 900.

The blasting design device 100 may generate a blasting design to perform a blasting operation of the blasting system 10, and may complement the blasting design based on data detected by at least one of the drilling device 500, the charging device 600, and the detonator setting device 700.

According to the embodiments, the blasting design device 100 may receive a base map from the outside, or the blasting design device 100 may directly generate a base map based on survey data surveyed by the surveying device 400.

Hereinafter, for convenience of description, the blasting design device 100 is described as directly generating the base map, however, the present invention is not limited thereto.

The blasting design device 100 may generate the blasting design based on the base map.

In the specification herein, the blasting design may include at least one of blasting hole information, explosive information and detonator information. The blasting hole information relates to detailed specifications for blasting holes required for precise blasting, and may include at least one of a position, depth, a charging amount, and a blasting hole spacing for a plurality of blasting holes. The explosive information relates to the specifications for explosives required for precise blasting, and may include at least one of energy density change, composition ratio, and specific gravity according to charging amount, charging length, type, and depth. The detonator information relates to the initial setting of an electronic detonator required for precise blasting, and may include at least one of type, position, initial time, and delay time of the electronic detonator.

In addition, the blasting design device 100 may generate a blasting design on the base map in consideration of the blasting cost, the crushing degree, the size of blasting region, and the like. According to the embodiments, the blasting design device 100 may generate the blasting design by using technologies such as artificial intelligence and big data.

The blasting design device 100 may transmit the detonator information of the blasting design to a plurality of electronic detonators ED, and directly set an initial time and a delay time to the electronic detonators ED. However, the present invention is not limited thereto. According to the embodiments, a separate component (for example, the detonator setting device 700) may set the initial time and the delay time to the electronic detonators ED. Hereinafter, for convenience of description, the detonator setting device 700 will be described as performing a detonator setting function.

The blasting design device 100 may complement the blasting design based on at least one of the drilling data, the charging data, and the setting data. In the specification herein, the complementing of the blasting design may refer to general complementary functions such as modifying some information contained in the blasting design or resetting input data to derive a new blasting design.

The network building device 200 may build a network at the blasting site. According to the embodiments, the network building device 200 may include at least one of a satellite telecommunication module, a wireless mobile communication module, a Bluetooth telecommunication module, a Wi-Fi telecommunication module and a LoRa telecommunication module.

The monitoring device 300 may monitor a situation of the blasting site in real time. The situation of the blasting site may include a position and an operating status of at least one of the surveying device 400, the drilling device 500, the charging device 600 and the detonator setting device 700, or a position and a route of an operator. In addition, the monitoring device 300 may perform a blasting analysis based on data detected by the blasting detection device 900, and may store the blasting analysis result in a database.

The surveying device 400 may survey the blasting site. The surveying device 400 may generate survey data and transmit the survey data to the blasting design device 100. As described above, the blasting design device 100 may generate a base map based on the survey data. However, the present invention is not limited thereto. According to the embodiments, the surveying device 400 may directly generate the base map based on the survey data and transmit the base map to the blasting design device 100. The base map may refer to three-dimensional topographic model data.

The drilling device 500 may form a plurality of blasting holes based on the blasting design. In other words, the drilling device 500 may form the blasting holes by drilling the ground surface according to at least one of a position, a depth, a charging amount, and blasting hole spacing that are indicated by the blasting hole information included in the blasting design.

The drilling device 500 may generate drilling data by detecting at least one of positions, depths, and slopes of the blasting holes, during forming at least one of the blasting holes.

The drilling data may include at least one of the positions, depths, and slopes of the detected actual blasting holes, and may further include separately derived information on the geology of bedrock.

The charging device 600 may charge at least one of explosives and electronic detonators to the blasting holes based on the blasting design. The charging device 600 may change the explosives while controlling specific gravity and composition of constituent materials of the explosives. In other words, the charging device 600 may charge the explosives to the blasting holes based on at least one of energy density change, composition ratio, and specific gravity according to charging amount, charging length, type, and depth indicated by the explosive information included in the blasting design. In the specification herein, the charging the electronic detonator signifies that the charging device 600 dispose the electronic detonator at any one of the inside, top, and bottom of the explosive.

The charging device 600 may generate the charging data by detecting at least one of energy density change, composition ratio, and specific gravity according to charging amount, charging length, type, and depth during charging at least one of the explosive and the electronic detonator. The charging data may include at least one of energy density change, composition ratio, and specific gravity according to charging amount, charging length, type, and depth with respect to the detected actual explosives. According to the embodiments, the charging device 600 may be implemented as a mobile processing unit (MPU) capable of detecting the charging process in real time.

The detonator setting device 700 may perform a detonator setting on the electronic detonators ED corresponding to the blasting holes based on the blasting design. The electronic detonator ED may be a wireless electronic detonator that transmits and receives a signal wirelessly through a wireless network. In the specification herein, the detonator setting may refer to an operation of inputting at least one of the initial time and the delay time of the detonator to the electronic detonator. According to the embodiments, the detonator setting device 700 may be implemented as a portable device (such as a computing device, a smart device, and a wearable device) carried by an operator at the blasting site.

The blasting device 800 may perform the blasting according to the blasting design. Specifically, the blasting device 800 may transmit a blasting command to the electronic detonators ED according to the detonator information. In addition, the electronic detonator EDs may be detonated according to the blasting command to explode the explosives. As a result, the blasting may be carried out.

The blasting detection device 900 may detect the blasting result. Details related to the blasting detection device 900 will be described in FIG. 10.

In order to perform communication through the wireless communication network, each component of the blasting system 10 according to the embodiments of the present invention may include a communication module for performing wireless communication. However, the present invention is not limited thereto. According to the embodiments, each component of the blasting system 10 may perform communication or transmit/receive data through a wired communication module or an external storage device input module (such as universal serial bus (USB) and SATA).

Figure 2:
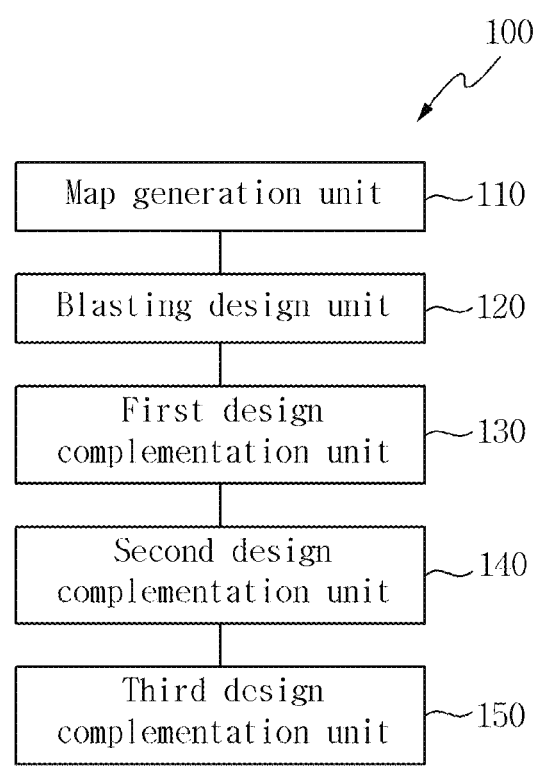
FIG. 2 is a view showing a blasting design device according to the embodiments of the present invention.

FIG. 2 is a view showing the blasting design device 100 according to the embodiments of the present invention. Referring to FIG. 2, the blasting design device 100 may include a map generation unit 110, a blasting design unit 120, a first design complementation unit 130, a second design complementation unit 140, and a third design complementation unit 150.

The map generation unit 110 may generate a base map, which is a three-dimensional topographical model according to the survey data generated by the surveying device 400 surveying the blasting site. However, the present invention is not limited thereto. According to the embodiments, the map generation unit 110 may be implemented as a separate device, or the map generation unit 110 may be implemented after integrated into the surveying device 400.

The blasting design unit 120 may generate a blasting design including at least one of blasting hole information, explosive information and detonator information, based on a base map.

The first design complementation unit 130 may complement at least one of the blasting hole information, the explosive information, and the detonator information according to drilling data, generated by the drilling device

500. In other words, the first design complementation unit 130 may apply the drilling data for the actual blasting hole onto the blasting design, so that the accuracy of the blasting design may be improved.

The second design complementation unit 140 may complement at least one of the explosive information and the detonator information according to the charging data generated by the charging device 600. In other words, the second design complementation unit 140 may apply the charging data for a charge of the actual explosive onto the blasting design, so that the accuracy of the blasting design may be improved.

The third design complementation unit 150 may complement the detonator information according to setting data generated by the detonator setting device 700. In other words, the third design complementation unit 150 may apply the setting data for the actual detonator onto the blasting design, so that the accuracy of the blasting design may be improved.

In particular, at least one of the first design complementation unit 130, the second design complementation unit 140, and the third design complementation unit 150 may receive the drilling, data, charging data, and setting data in real time, and directly apply the received data onto the blasting design, so that the blasting design may be complemented in real time.

For example, while the drilling device 500 is performing the drilling, the actual drilling result of a first blasting hole formed previously may be applied to the blasting design, so that an expected drilling design of a second blasting hole, which is not formed yet, may be corrected. In addition, while the charging device 600 is performing the charging, the actual charging result of a first explosive charged preciously may be applied to the blasting design, so that an expected charging design of a second explosive, which is not charged yet, may be corrected. In addition, while the detonator setting device 700 is performing the detonator setting, the actual setting result of a first detonator set previously may be applied to the blasting design, so that an expected setting design of a second detonator, which is not designed yet, may be corrected. Accordingly, the blasting design for implementing effective blasting is generated and complemented in real time, so that the blasting system of the present invention can improve the blasting effect.

Figure 3:
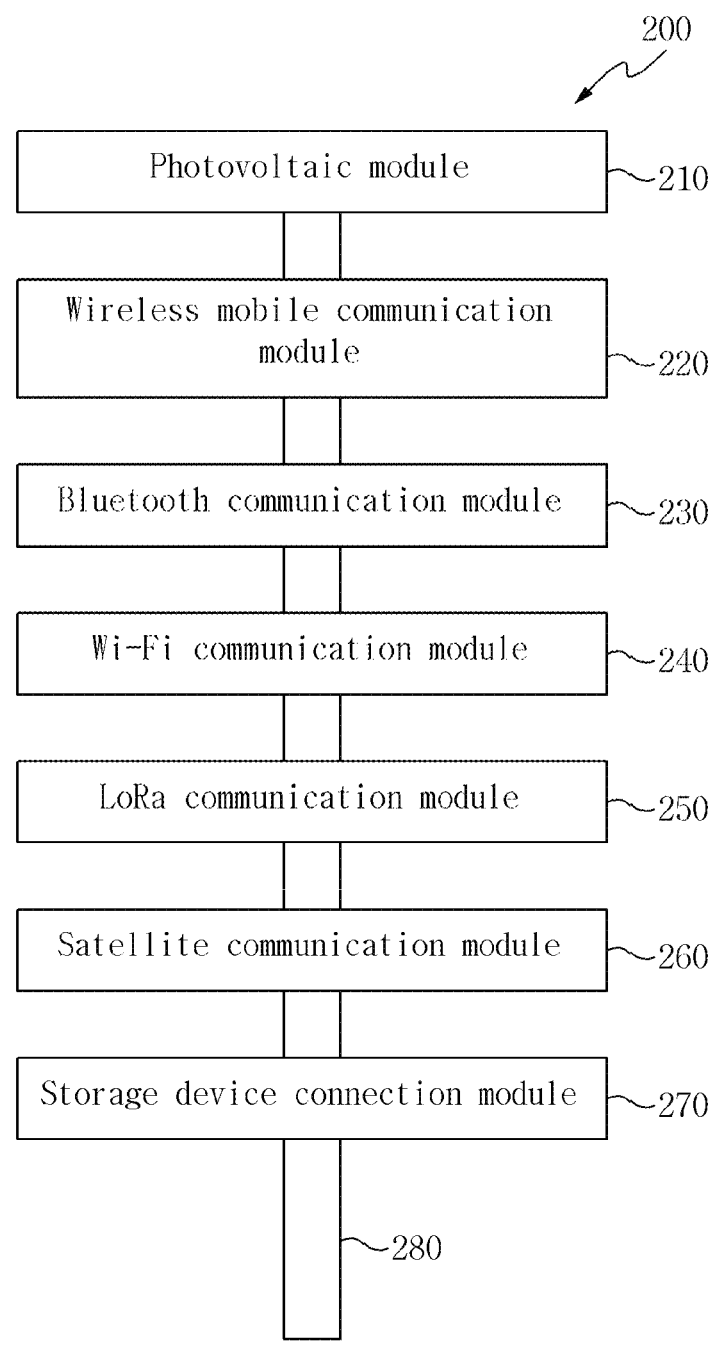
FIG. 3 is a view showing a network building device according to the embodiments of the present invention.

FIG. 3 is a view showing the network building device 200 according to the embodiments of the present invention. FIG. 3 shows that the network building device 200 is implemented as a repeater type device, however, the present invention is not limited thereto. According to the embodiments, the network building device 200 may be modified and utilized as various types within the scope of achieving the objects of the present invention.

Referring to FIG. 3, the network building device 200 may include a photovoltaic module 210, a wireless mobile communication module 220 a Bluetooth communication module 230, a Wi-Fi communication module 240, a LoRa communication module 250, a satellite communication module 260, a storage device connection module 270, and a support unit 280.

The photovoltaic module 210 may convert sunlight into electrical energy and supply power to the network building device 200. According to the embodiments, the photovoltaic module 210 may supply the power to at least one of a vibration detection unit and a noise detection unit of the blasting detection device 900 (see FIG. 1).

The wireless mobile communication module 220, the Bluetooth communication module 230, the Wi-Fi communication module 240, the LoRa communication module 250 and the satellite communication module 260 may establish a network at the blasting site by using a corresponding communication system.

The storage device connection module 270 may receive data stored in a separate storage device.

For example, the blasting system of the present invention may be connected to the Internet through the wireless mobile communication module 220 to receive the monitoring result of the monitoring device 300 (see FIG. 1).

In addition, the network building device 200 may communicate with another network building devices or a blasting headquarter through the Wi-Fi communication module 240.

In addition, the network building device 200 may communicate with at least one of the blasting design device 100, the surveying device 400, the drilling device 500, the charging device 600, the detonator setting device 700, the blasting device 800 and the blasting detection device 900, through at least one of the Wi-Fi communication module 240, the LoRa communication module 250 and the storage device connection module 270.

According to the embodiments, the Wi-Fi communication module 240 may have a network communication radius of 5 km or more using a directional Wi-Fi system. The LoRa communication module 250 may have a network communication radius of 2.5 km. The storage device connection module 270 may be connected to a separate external storage device through a universal serial bus (USB) interface.

The support unit 280 may support and fix the components of the network building device 200 to the ground. According to the embodiments, the support unit 280 may have a cylindrical column shape.

The above-described communication schemes are merely exemplary, and the present invention is not limited thereto. According to the embodiments, at least one of the wireless mobile communication module 220, the Bluetooth communication module 230, the Wi-Fi communication module 240, the LoRa communication module 250 and the satellite communication module 260 may be utilized in various ways in the communication network within the blasting system of the present invention.

Figure 4:
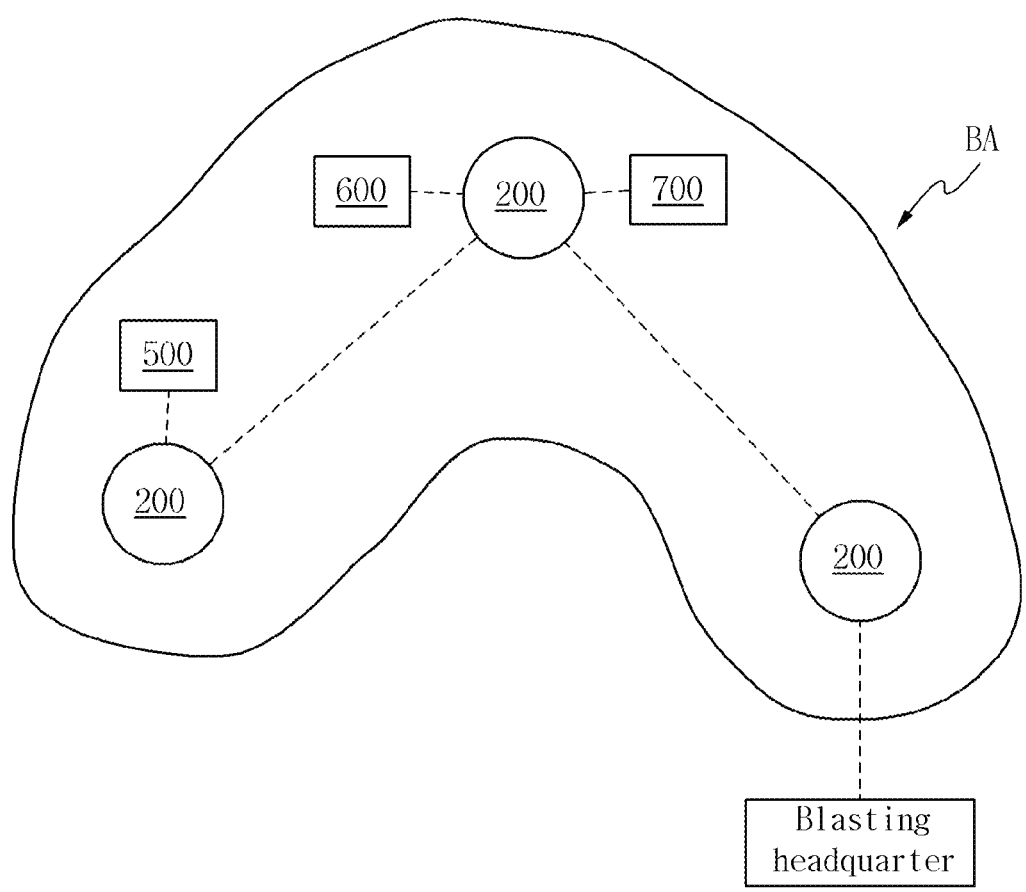
FIG. 4 is a view showing a blasting site in which the network building device is installed according to the embodiments of the present invention.

FIG. 4 is a view showing a blasting site BA in which the network building device 200 is installed according to the embodiments of the present invention. FIG. 4 schematically shows the blasting site when viewed from the air according to one exemplary embodiment of the present invention.

Referring to FIGS. 3 and 4, the network building device 200 may be disposed at the blasting site BA. As shown in FIG. 4, the drilling device 500, the charging device 600, and the detonator setting device 700 may be positioned in the blasting site BA. For example, a plurality of network building devices 200 may be provided in order to form a network in the blasting site BA having various structures and areas.

The network building devices 200 may communicate with each other through the Wi-Fi communication modules 240, and communicate with the blasting headquarter. A layout of the network building devices 200 may be included in the blasting design generated by the blasting design device 100 (see FIG. 1).

According to the embodiments, a distance between the blasting headquarter and any one of the network building devices 200 may be designed to be less than 100 m in order to ensure data transmission stability.

For example, at least one of the surveying device 400, the drilling device 500, the charging device 600 and the detonator setting device 700 may communication with the network building device 200 by using any one of the Wi-Fi communication module 240, the LoRa communication module 250, and the storage device connection module 270. In particular, movement paths of the surveying device 400, the drilling device 500, the charging device 600 and the detonator setting device 700 may be transferred to the network building device 200 by using any one of the Wi-Fi communication module 240, the LoRa communication module 250 and the storage device connection module 270, and transferred to the monitoring device 300 through the wireless mobile communication module 220.

Figure 5:
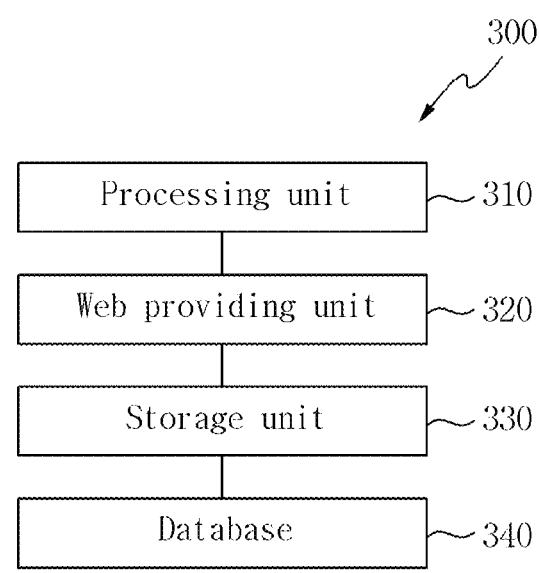
FIG. 5 is a view showing a monitoring device according to the embodiments of the present invention.

FIG. 5 is a view showing the monitoring device 300 according to the embodiments of the present invention.

Referring to FIG. 5, the monitoring device 300 may include a processing unit 310, a web providing unit 320, the a storage unit 330 and a database 340.

The processing unit 310 may monitor the entire blasting process in real time. For example, referring to FIGS. 1 and 5, the processing unit 310 may receive information about a movement path or operation status from at least one of the surveying device 400, the drilling device 500, the charging device 600 and the detonator setting device 700, and monitor the blasting process in real time based on the received information.

In addition, the processing unit 310 may perform a blasting analysis. For example, the processing unit 310 may perform the blasting analysis based on the blasting detection data received from the blasting detection device 900, and store the analysis result in the database 340.

The web providing unit 320 may provide the monitoring result by the processing unit 310 in real time through the web. The web herein, as a web service, refers to a software system for interaction between different types of computers on a network. According to the embodiments, the web providing unit 320 may always share the blasting information and support the blasting analysis anytime, anywhere through the Amazon web service.

The storage unit 330 may store the monitoring result in a cloud server. The cloud herein refers to any infrastructure, platform, software or technology accessed by users through the Internet without additional software downloads. The cloud server, as a pooled, centralized server, refers to a server hosted and provided through a network (usually the Internet) and accessible on-demand by multiple users.

The database 340 may store the blasting analysis result. For example, the database 340 may be implemented as a separate storage server or storage device for storing data.

Figure 6:
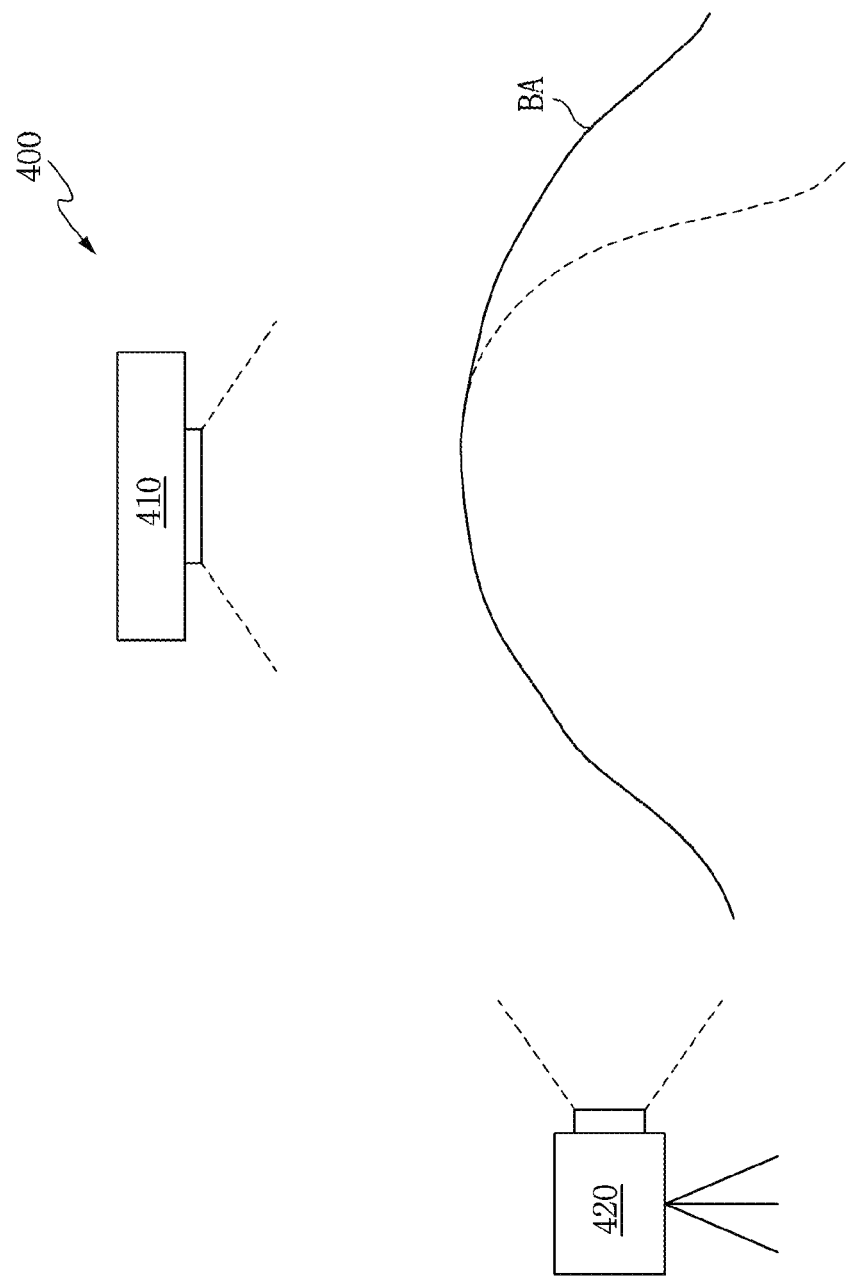
FIG. 6 is a view showing a surveying device according to the embodiments of the present invention.

FIG. 6 is a view showing the surveying device 400 according to the embodiments of the present invention.

Referring to FIG. 6, the surveying device 400 may include an unmanned aerial vehicle 410 and a radar 420.

The unmanned aerial vehicle 410 may generate first survey data by three-dimensionally surveying the blasting site BA in the air. According to the embodiments, the unmanned aerial vehicle 410 may be implemented as a drone device for base mapping. The drone does not have an actual pilot on board, and refers to the entire system of aircraft, on-board mission equipment, ground control equipment (GCS), communication equipment (data link), support equipment and operating personnel that fly automatically or semi-automatically according to a route pre-programmed on the ground.

The radar 420 may generate second survey data by three-dimensionally surveying the blasting site BA on the ground. According to the embodiments, the radar 420 may be implemented as a laser radar, that is a light imaging detection and ranging (LIDAR). The LIDAR refers to a remote sensing device that can measure a distance by irradiating an object with a laser and analyzing the reflected light.

The survey device 400 may transmit the first survey data and the second survey data to the blasting design device 100 (see FIG. 1).

According to the embodiments, the surveying device 400 may further include a map generation unit for generating the base map. The map generation unit (not shown) may generate the base map based on at least one of the first survey data and the second survey data. The base map may include a three-dimensional topographical model. For example, the map generation unit may be implemented as a computing device or a smart device. The surveying device 400 may transmit the base map to the blasting design device 100.

Figure 7:
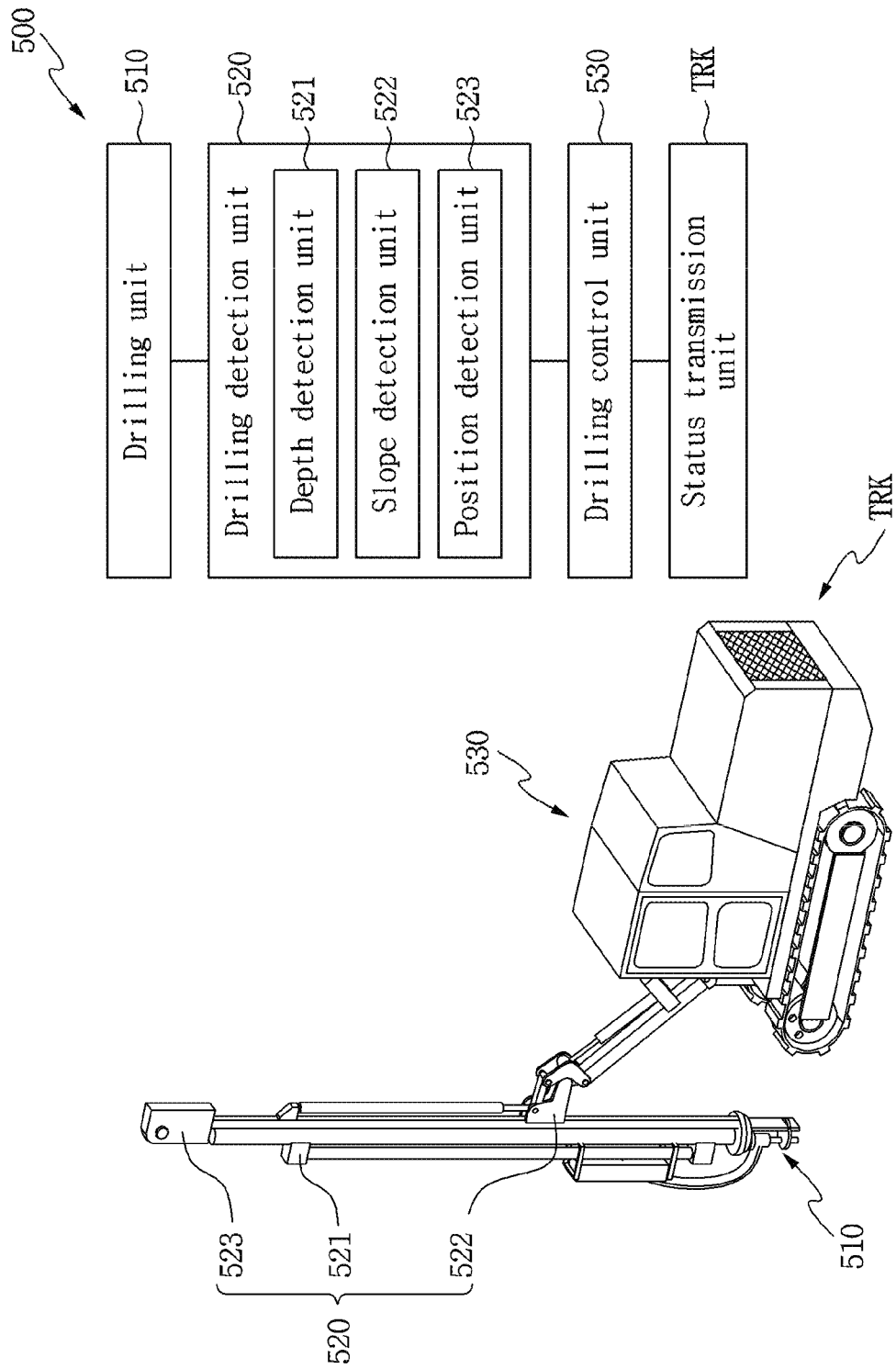
FIG. 7 is a view showing a drilling device according to the embodiments of the present invention.

FIG. 7 is a view showing the drilling device 500 according to the embodiments of the present invention. FIG. 7 shows that the drilling device 500 has a rotary excavator structure, however, the present invention is not limited thereto. In addition, the regions indicated with reference numerals are arbitrarily designated in the drawing of the rotary excavator in FIG. 7, and the present invention is not limited thereto. In FIG. 7, for convenience of description, a view for the excavator and a block diagram are shown together.

Referring to FIG. 7, the drilling device 500 may include a drilling unit 510, a drilling detection unit 520, a drilling control unit 530, and a status transmission unit TRK.

The drilling unit 510 has a drill structure of the rotary excavator, and may form blasting holes by drilling the ground surface according to the blasting hole information.

The drilling detection unit 520 may generate drilling data by detecting at least one of positions, depths, and slopes of the blasting holes during forming at least one of the blasting holes. The drilling data may include an error with respect to the blasting hole information.

For example, the drilling detection unit 520 may include a depth detection unit 521, a slope detection unit 522, and a position detection unit 523.

The depth detection unit 521 may be disposed in the drilling unit 510 to detect the depth of the blasting hole. According to the embodiments, the depth detection unit 521 may detect at least one of the rotation angle, the rotation count and the rotation speed of the drilling unit 510, and detect the depth of the blasting hole formed based on the above detection.

The slope detection unit 522 may be disposed in the drilling unit 510 to detect the slope. Specifically, the slope detection unit 522 may detect at least one of the slope of the blasting hole and the slope of the drilling unit 510.

The position detection unit 523 may be disposed on an upper side of the drilling unit 510 to detect a position of the blasting hole. In other words, the position detection unit 523 may be placed at the top of a drill of the drilling unit 510 in order to more easily receive satellite signals and accurately correspond to the position of the blasting hole. For example, the position detection unit 523 may be connected to a separate antenna and measure the position of the blasting hole by using a global satellite navigation system. According to the embodiments, the position detection unit 523 may be implemented by a global navigation satellite system (GLASS) such as real-time kinematic global positioning system, global positioning system (GPS), Glonass, Beidu-2, and Galileo.

According to the embodiments, the position detection unit 520 may measure the position of the drilling device 500. For example, when the position of the blasting hole included in the blasting hole information matches the position of the drilling device 500 measured by the position detection unit 520, the drilling device 500 may initiate the drilling.

Although not shown in FIG. 7, the detection unit 520 may further include a vibration detection unit for detecting vibration due to the drilling.

The drilling control unit 530, as a computing device for controlling the drilling device 500, may be placed in a driver's seat and check a drilling status in real time. According to the embodiments, the drilling control unit 530 may include at least one of a tablet device and a signal processing module (programmable logic controller (PLC)). In addition, the drilling control unit 530 may classify the strength of the bedrock into soft rock, normal rock, hard rock, and the like based on the drilling data and store the classification result in the drilling data.

The status transmission unit TRK may be mounted on the drilling device 500 to transmit at least one of a position status (such as a movement path and a current position) and an operation status of the drilling device 500 to the monitoring device 300 through the network building device 200 (see FIG. 1).

Figure 8:
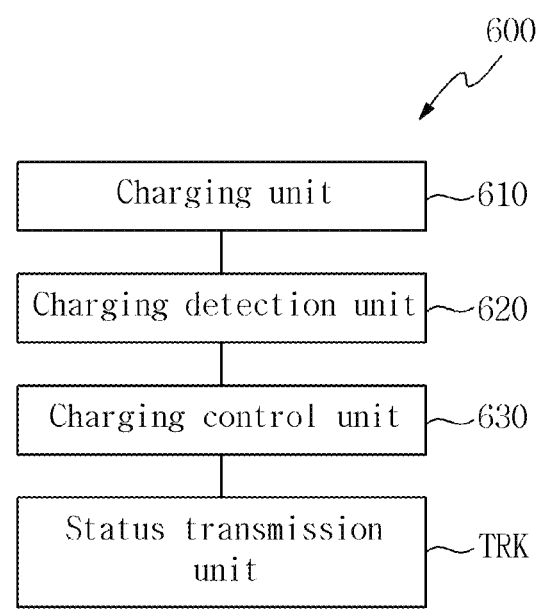
FIG. 8 is a view showing a charging device according to the embodiments of the present invention.

FIG. 8 is a view showing the charging device 600 according to the embodiments of the present invention. According to the embodiments, the charging device 600 may have a truck structure such as a mobile processing unit (MPU). However, the present invention is not limited thereto. The charging device 600 may be implemented in various devices within the scope of achieving the objects of the present invention.

Referring to FIG. 8, the charging device 600 may include a charging unit 610, a charge detection unit 620, a charging control unit 630 and a status transmission unit TRK.

The charging unit 610 may be implemented as an explosives injection module including at least one of a tank, a pump and a nozzle of the mobile processing unit, and charge at least one of the explosive and the electronic detonator into the blasting hole according to the explosive information.

The charge detection unit 620 may generate the charging data by detecting at least one of energy density change, composition ratio, and specific gravity according to charging amount, charging length, type, and depth during charging at least one of the explosive and the electronic detonator.

The charging control unit 630 is a computing device for controlling the charging device 600, and may be placed in the drives seat to check the charging status in real time.

The status transmission unit TRK may be mounted on the charging device 600 to transmit at least one of a position status (such as a movement path and a current position) and an operation status of the charging device 600 to the monitoring device 300 through the network building device 200 (see FIG. 1).

Figure 9:
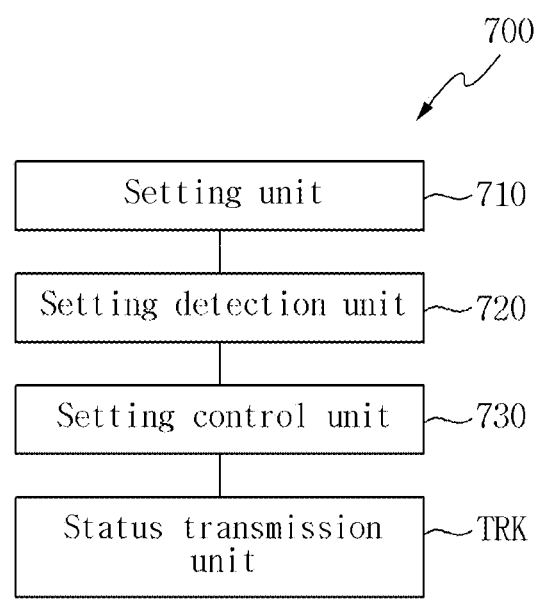
FIG. 9 is a view showing a detonator setting device according to the embodiments of the present invention.

FIG. 9 is a view showing the detonator setting device 700 according to the embodiments of the present invention.

Referring to FIG. 9, the detonator setting device 700 may include a setting unit 710, a setting detection unit 720, a setting control unit 730, and a status transmission unit TRK.

The setting unit 710 may be implemented as an operator device at the blasting site, and set at least one of an initial time and a delay time to the electronic detonator.

The setting detection unit 720 may generate setting data by detecting at least one of a position, a type, an identification code, and a detonation energy of the electronic detonator.

The setting control unit 730 may control the setting device 700 and check a setting status in real time.

The status transmission unit TRK may be mounted on the setting device 700 to transmit at least one of a position status (such as a movement path and a current position) and an operation status of the setting device 700 to the monitoring device 300 through the network building device 200 (see FIG. 1).

Figure 10:
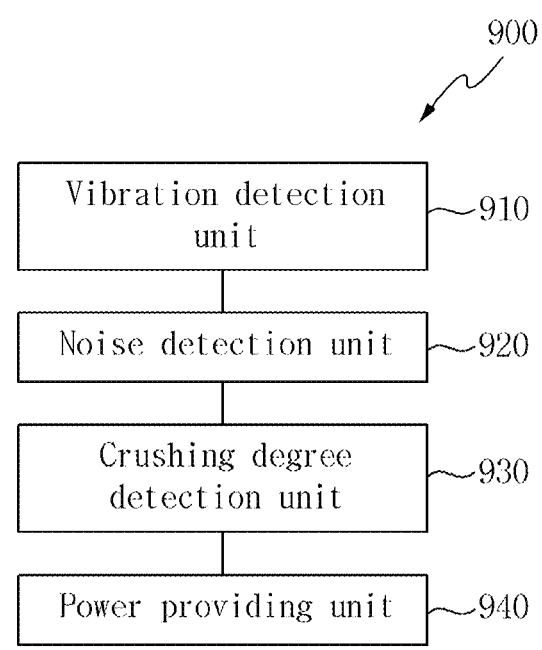
FIG. 10 is a view showing a blasting detection device according to the embodiments of the present invention.

FIG. 10 is a view showing the blasting detection device 900 according to the embodiments of the present invention.

Referring to FIG. 10, the blasting detection device 900 may include a vibration detection unit 910, a noise detection unit 920, a crushing degree detection unit 930, and a power supply unit 940.

The vibration detection unit 910 may generate vibration data by detecting vibration generated according to the blasting. The vibration data may represent a vibration pattern according to the blasting. According to the embodiments, the vibration detection unit 910 may include a separate vibration sensor.

The noise detection unit 920 may generate noise data by detecting noise generated due to the blasting. The noise data may represent a noise pattern according to the blasting. According to the embodiments, the noise detection unit 920 may include a separate noise sensor.

The crushing degree detection unit 930 may generate crushing degree data by detecting the crushing degree of rock according to blasting. In the specification herein, the crushing degree refers to the rock fragmentation according to blasting. The crushing degree detection unit 930 may learn a block division algorithm, so that the crushing degree of the rock may be calculated from a rock image.

According to the embodiments, the crushing degree detection unit 930 may photograph crushed stone using a drone for topographical production in a unit blasting region after the blasting, and perform a crushing degree analysis by processing an image of the crushed stone as an ortho-image.

The power supply unit 940 may supply power to at least one of the vibration detection unit 910, the noise detection unit 920, and the crushing degree detection unit 930. For example, the power supply unit 940 may be implemented as a photovoltaic module or a batter module, and may transfer electrical energy to at least one of the vibration detection unit 910, the noise detection unit 920, and the crashing degree detection unit 930.

The monitoring device 300 (see FIG. 1) may analyze the blasting result based on at least one of the vibration data, the noise data, and the crushing degree data.

The monitoring device 300 may store the blasting result in the database, and accordingly, the blasting design device 100 may perform the blasting design by using the database afterward.

The monitoring device 300 may receive at least one of the vibration data, the noise data, and the crushing degree data, and may analyze the blasting based on the at least one of the vibration data, the noise data, and the crushing degree data. For example, when, as a result of the blasting, the required crushing degree or vibration is not achieved, the monitoring device 300 may provide the database to the blasting design device 100 in order to improve the blasting design. For example, the blasting design device 100 may apply the analysis result stored in the database upon generation of the blasting design to improve the blasting design, so that the depth or spacing of the blasting hole may be adjusted or the explosives may be increased or decreased.

Figure 11:
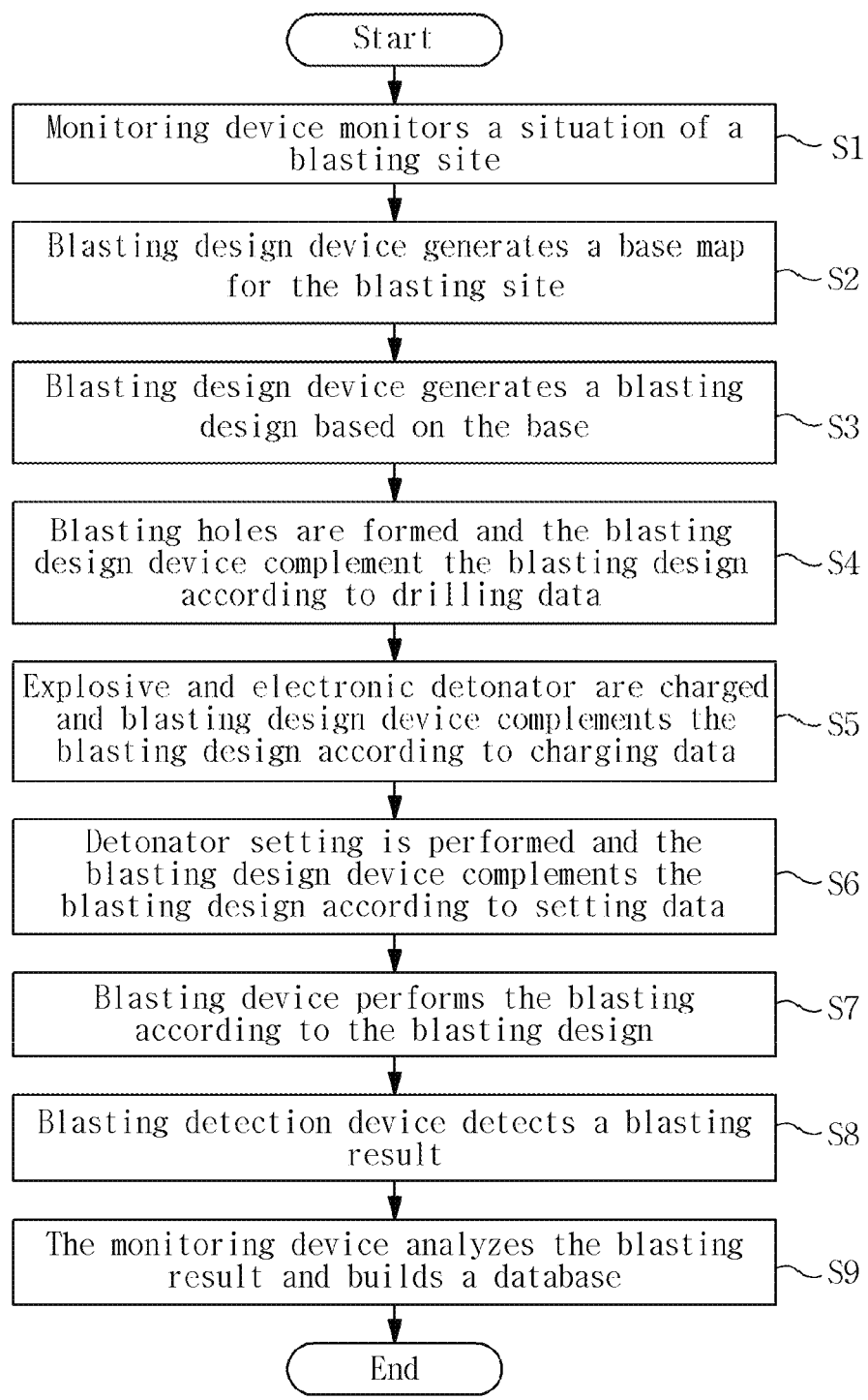
FIG. 11 is a flowchart showing an operation method of the blasting system according to the embodiments of the present invention.

FIG. 11 is a flowchart showing an operation method of the blasting system according to the embodiments of the present invention. Hereinafter, the operation method of the blasting system 10 of the present invention will be described in detail with reference to FIGS. 1 to 11.

The monitoring device 300 may monitor a situation of the blasting site in real time (S1). For example, the monitoring device 300 may monitor the situation of the blasting site in real time through the network and provide the situation to the operator in real time.

The surveying device 400 may survey the blasting site, and the blasting design device 100 may generate the base map according to the survey data generated by the surveying device 400 (S2). For example, the surveying device 400 may three dimensionally survey the blasting site, and the blasting design device 100 may generate a base map that represents a three-dimensional topographical model.

The blasting design device 100 may generate a blasting design including at least one of blasting hole information, explosive information and detonator information, based on the base map (S3). The blasting hole information may include at least one of a position, depth, a charging amount, and a blasting hole spacing for a plurality of blasting holes, the explosive information may include at least one of energy density change, composition ratio, and specific gravity according to charging amount, charging length, type, and depth, and the detonator information may include at least one of type, position, initial time, and delay time of the electronic detonator.

The drilling device 500 may form a plurality of blasting holes based on the blasting design, and the blasting design device 100 complement the blasting design according to drilling data generated by the drilling device 500 (S4).

The charging device 600 may charge at least one of an explosive and an electronic detonator to the blasting holes based on the blasting design, and the blasting design device 100 may complement the blasting design according to charging data generated by the charging device 600 (S5).

The detonator setting device 700 may perform a detonator setting on a plurality of electronic detonators corresponding to the blasting holes based on the blasting design, and the blasting design device 100 may complement the blasting design according to setting data generated by the detonator setting device 700 (S6).

The blasting device 800 may perform the blasting according to the blasting design (S7). The blasting device 800 may perform the blasting by transmitting a blasting command to the electronic detonator to detonate the electronic detonator and explode the explosive.

The blasting detection device 900 may detect a blasting result by detecting at least one of vibration, noise and crushing degree according to the blasting (S8). The blasting detection device 900 may include a plurality of detection modules disposed throughout the blasting site to detect the blasting.

The monitoring device 300 may analyze the blasting result and build a database based on the analyzed result (S9). The monitoring device 300 may monitor and manage situations in the process of preparing the blasting, during the blasting and after completion of the blasting, and may analyze the blasting and build a database based on the obtained data.

The monitoring device 300 may analyze the blasting result and build the database, so that the blasting design device 100 may improve the blasting design by using the database.

Figure 12:
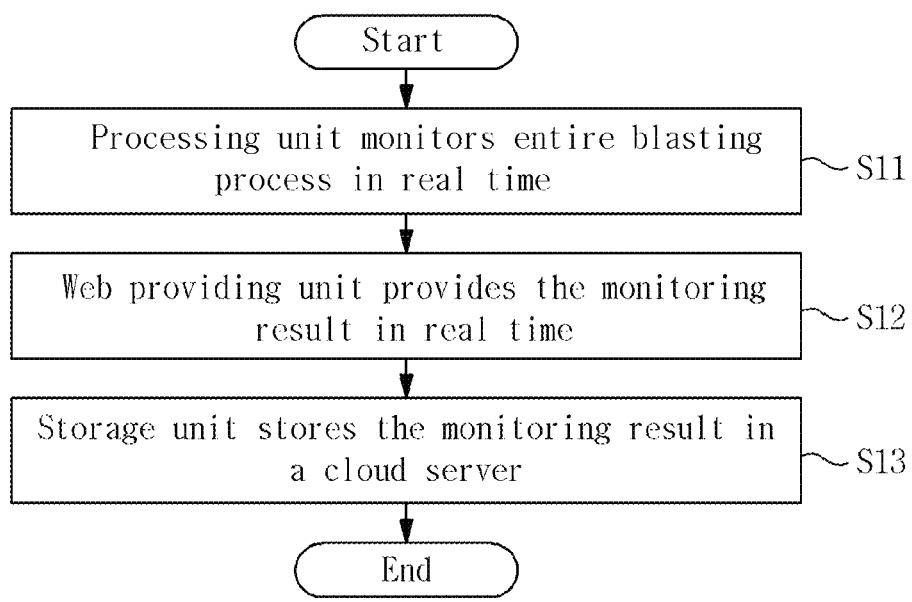
FIG. 12 is a flowchart showing in detail the operation method of the blasting system according to the embodiments of the present invention.

FIG. 12 is a flowchart showing in detail the operation method of the blasting system according to the embodiments of the present invention. Hereinafter, the step (S1) of monitoring a situation of the blasting site will be described in detail with reference to FIGS. 1 to 12. The situation of the blasting site may include a position and an operating status of at least one of the surveying device 400, the drilling device 500, the charging device 600 and the detonator setting device 700, or a position and a route of an operator.

The processing unit 310 may monitor the entire blasting process in real time (S11). The processing unit 310 may receive a position status and an operation status from at least one of the surveying device 400, the drilling device 500, the charging device 600 and the detonator setting device 700, and and accordingly, may monitor the entire blasting process for the blasting site.

The web providing unit 320 may provide the monitoring result of the processing unit 310 in real time through the web (S12). The web providing unit 320 may access the Internet through a wireless communication module or a wired communication module, and may provide the monitoring result by using an image such as a map or an operation status user interface.

The storage unit 330 may store the monitoring result in the cloud server (S13). The storage unit 330 may store the result in a separate cloud system.

Figure 13:
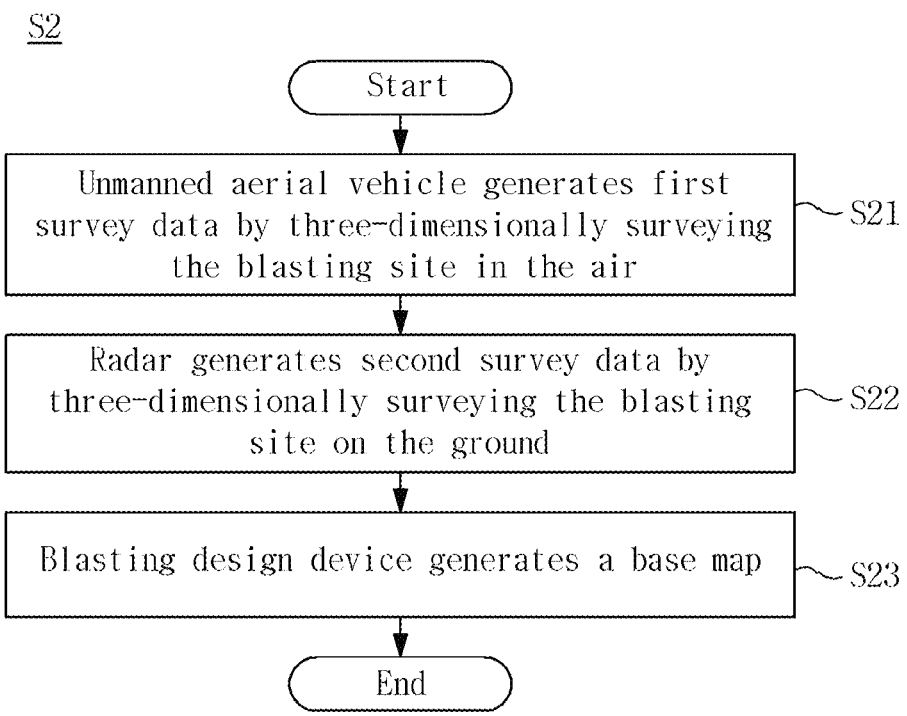
FIG. 13 is a flowchart showing in detail the operation method of the blasting system according to the embodiments of the present invention.

FIG. 13 is a flowchart showing in detail the operation method of the blasting system according to the embodiments of the present invention. Hereinafter, the step (S2) of generating the base map will be described in detail with reference to FIGS. 1 to 13.

The unmanned aerial vehicle 410 may generate the first survey data by three-dimensionally surveying the blasting site in the air (S21). The unmanned aerial vehicle 410 may be implemented as a rotating-wing vehicle or a fixed-wing vehicle, and may fly over the blasting site along a preset route. The unmanned aerial vehicle 410 may survey the blasting site during flight.

The radar 420 may generate the second survey data by three-dimensionally surveying the blasting site (S22). The radar 420 may survey the blasting site by irradiating a laser towards the blasting site and collecting the reflected light. The radar 420 may be fixed at a specific point, however, the present invention is not limited thereto. According to the embodiments, the radar 420 is movable.

The blasting design device 100 may generate a base map, which is a three-dimensional topographical model, based on at least one of the first survey data and the second survey data received from the unmanned aerial vehicle 410 and the radar 420 (S23). The blasting design device 100 may include a separate base map generation module. According to the embodiments, the operation of the blasting design device 100 may be implemented by a separate device.

Figure 14:
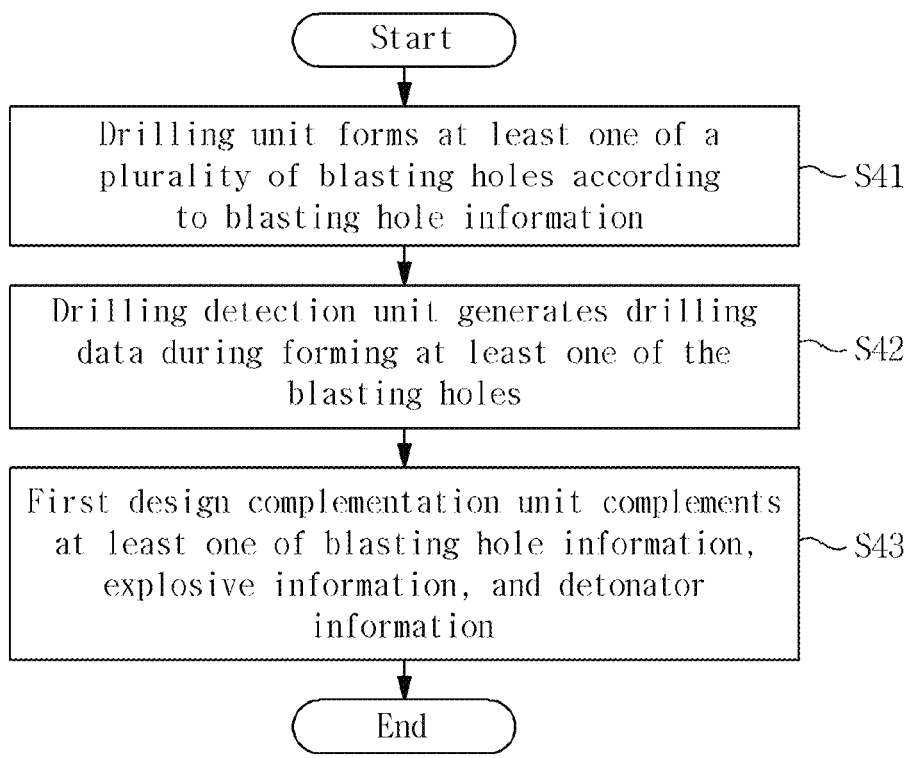
FIG. 14 is a flowchart showing in detail the operation method of the blasting system according to the embodiments of the present invention.

FIG. 14 is a flowchart showing in detail the operation method of the blasting system according to the embodiments of the present invention. Hereinafter, the step (S4) of complementing the blasting design according to the drilling data will be described in detail with reference to FIGS. 1 to 14.

The drilling unit 510 may form at least one of the blasting holes according to the blasting hole information (S41). The drilling unit 510 may form the blasting hole to a predetermined depth by drilling the ground.

The chilling detection unit 520 may generate drilling data by detecting at least one of positions, depths, and slopes of the blasting holes, during forming at least one of the blasting holes (S42). For example, the drilling detection unit 520 may detect a drilling status by using a plurality of sensors installed in the excavator.

The first design complementation unit 130 of the blasting design device 100 may complement in real time at least one of the blasting hole information, the explosive information, and the detonator information included in the blasting design, based on the drilling data (S43).

Figure 15:
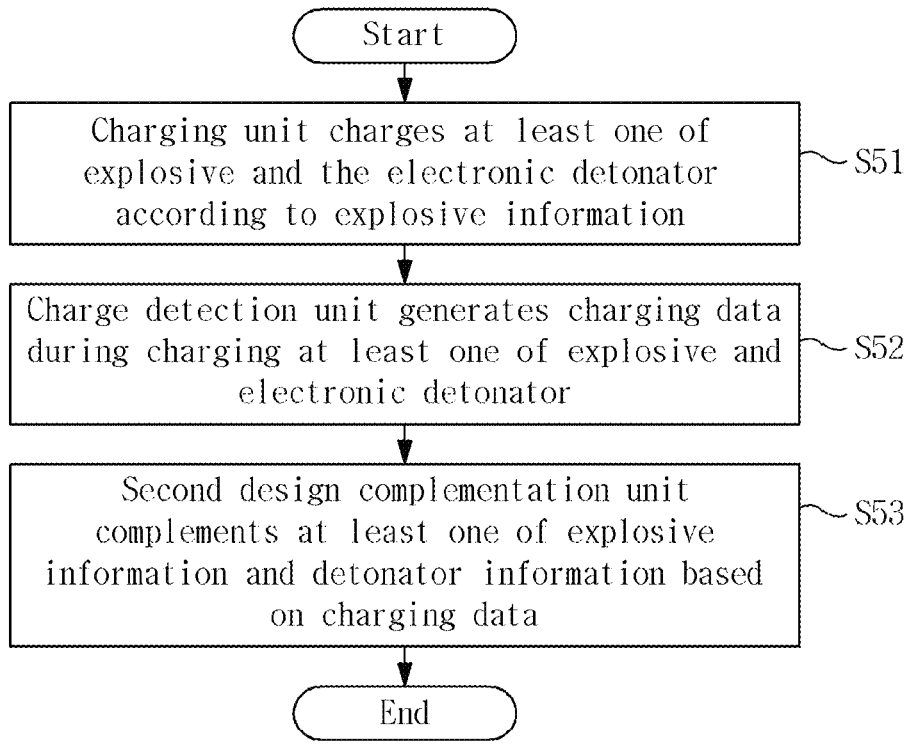
FIG. 15 is a flowchart showing in detail the operation method of the blasting system according to the embodiments of the present invention.

FIG. 15 is a flowchart showing in detail the operation method of the blasting system according to the embodiments of the present invention. Hereinafter, the step (S15) of complementing the blasting design according to the charging data will be described in detail with reference to FIGS. 1 to 15.

The charging unit 610 may charge at least one of the explosive and the electronic detonator into at least one of the blasting holes according to the explosive information (S51). The charging unit 610 may include tanks for storing explosive compositions and nozzles for formulating the compositions into the explosive, and may charge the explosive into the blasting holes by using the pumps.

The charge detection unit 620 may generate the charging data by detecting at least one of energy density change, composition ratio, and specific gravity according to charging amount, charging length, type, and depth during charging at least one of the explosive and the electronic detonator (S52). The charge detection unit 620 may check the charging status by using a plurality of sensors installed on a charging truck.

The second design complementation unit 140 of the blasting design device 100 may complement in real time at least one of the explosive information and the detonator information included in the blasting design, based on the charging data (S53).

Figure 16:
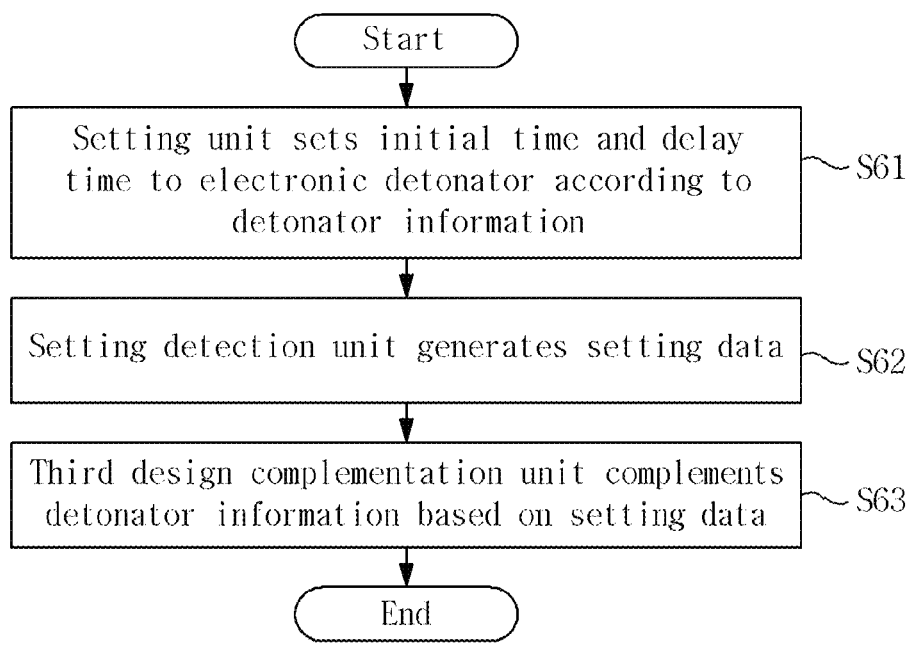
FIG. 16 is a flowchart showing in detail the operation method of the blasting system according to the embodiments of the present invention.

FIG. 16 is a flowchart showing in detail the operation method of the blasting system according to the embodiments of the present invention. Hereinafter, the step (S6) of complementing the blasting design according to the setting data will be described in detail with reference to FIGS. 1 to 16.

The setting unit 710 may set the initial time and the delay time to the electronic detonator according to the detonator information (S61). The setting unit 710 may be carried by the operator and connected to the electronic detonator. The setting unit 710 may recognize the identification number of the electronic detonator and then transmit corresponding detonator information (such as initial time and delay time) to the electronic detonator.

The setting detection unit 720 may generate setting data by detecting at least one of a position, a type, an identification code, and a detonation energy of the electronic detonators (S62). The setting detection unit 720 may detect a set status (such as initial time, delay time, detonator identification number, detonator status, and replacement status) by using a plurality of sensors installed in a terminal device.

The third design complementation unit 150 of the blasting design device 100 may complement in real time the detonator information included in the blasting design, based on the setting data (S63).

Figure 17:
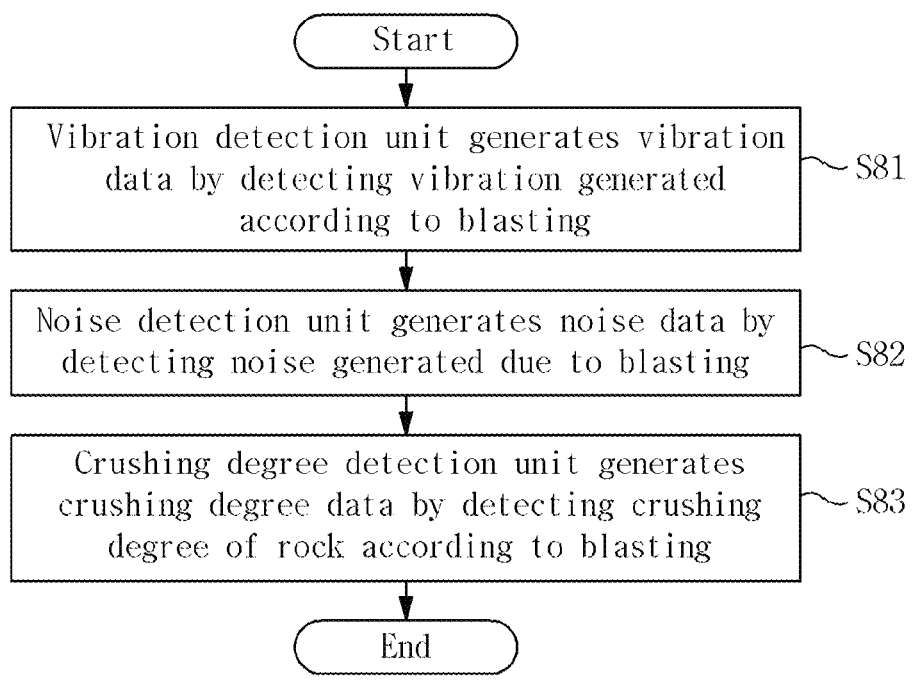
FIG. 17 is a flowchart showing in detail the operation method of the blasting system according to the embodiments of the present invention.

FIG. 17 is a flowchart showing in detail the operation method of the blasting system according to the embodiments of the present invention. Hereinafter, the step (S8) of detecting the blasting result will be described in detail with reference to FIGS. 1 to 17.

The vibration detection unit 910 may generate vibration data by detecting vibration generated according to the blasting (S81). The vibration detection unit 910 may include a plurality of vibration sensors installed throughout the blasting site. The vibration detection unit 910 may detect the blasting vibration by using the vibration sensor and generate vibration data based on the detection result.

The noise detection unit 920 may generate noise data by detecting noise generated due to the blasting (S82). The noise detection unit 920 may include a plurality of noise sensors installed throughout the blasting site. The noise detection unit 920 may detect the blasting noise by using the noise sensor and generate noise data based on the detection result.

The crushing degree detection unit 930 may generate crushing degree data by detecting the crushing degree of rock according to blasting (S83). The crushing degree detection unit 930 may photograph crushed stone using a drone for topographical production in a unit blasting region after the blasting, and perform a crushing degree analysis by processing an image of the crushed stone as an ortho-image.

Figure 18:
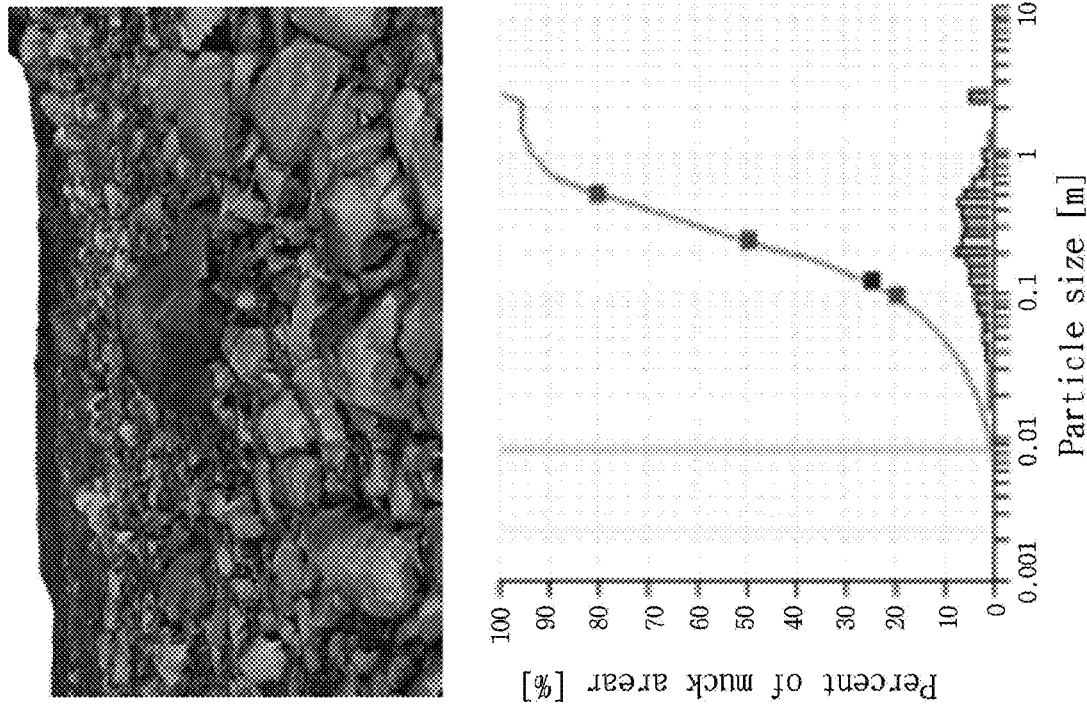
FIG. 18 is a view showing the operation method of the blasting system according to the embodiments of the present invention.

FIG. 18 is a view showing the crushing degree analysis operation according to the embodiments of the present invention.

Referring to FIGS. 1 and 18, the crushing degree detection unit 930 may photograph crushed stone using a drone for topographical production in a unit blasting region after the blasting, and perform a crushing degree analysis by processing an image of the crushed stone as an ortho-image. The drone for topographical production in a unit blasting region may be a device different from the unmanned aerial vehicle 410.

The three-dimensional data surveyed by the crushing degree detection unit 930 may be classified through a point cloud technique. The present invention is not limited thereto, and the crushing, degree detection unit 930 may process the surveyed three-dimensional data by using various types of data classification techniques within the scope of achieving the objects of the present invention.

In addition, based on each point, the rock image of the surveyed blasting site may be blocked and divided into a plurality of regions according to sizes of the rock. The block division algorithm may be trained through artificial intelligence, big data, or machine learning models.

As a result, the crushing degree of the rock may be analyzed according to the classification of the size and number of blocks, as in the graph shown in FIG. 18. The crushing degree detection unit 930 may determine whether the blasting has been performed according to the initially designed scale and intensity, based on the size and number of blocks.

Through the above-described scheme, according to the blasting design device, the blasting system and the operation method of the same of the present invention, the blasting can be performed based on a blasting plan and the blasting results can be analyzed.

In addition, according to the blasting design device, the blasting system and the operation method of the same of the present invention, the blasting can be performed using a wireless communication network by providing a private communication network.

In addition, according to the blasting design device, the blasting system and the operation method of the same of the present invention, the three-dimensional topographical model for a blasting site can be formed by using a drone and a laser radar for providing a topographical information service of the blasting site, and the blasting design can be performed more precisely by using the three-dimensional model.

In addition, according to the blasting design device, the blasting system and the operation method of the same of the present invention, the drilling and blasting can be precisely designed based on drilling data according to drilling of blasting holes.

In addition, according to the blasting design device, the blasting system and the operation method of the same of the present invention, the charging and blasting can be precisely design based on charging data according to an explosive charging.

In addition, according to the blasting design device, the blasting system and the operation method of the same of the present invention, the detonator can be precisely set and the blasting can be precisely designed based on setting data according to detonator setting.

In addition, according to the blasting design device, the blasting system and the operation method of the same of the present invention, the optimal blasting pattern can be outputted using artificial intelligence, big data and machine learning technology, so that the blasting effect can be improved.

In addition, according to the blasting design device, the blasting system and the operation method of the same of the present invention, the blasting site (such as blasting equipment, blasting personnel, and working hours) can be checked in real time using a web service, and the blasting-related data can be stored in a cloud storage server.

The functional operations described in the present specification and the embodiments related to the present subject matter may be implemented in a digital electronic circuit, computer software, firmware or hardware, or in at least one combination thereof, including structures disclosed herein and structural equivalents thereof.

The embodiments of the subject matter described herein may be implemented by at least one computer program product, that is, implemented as at least one module for computer program instructions encoded on a tangible program medium for execution by a data processing device or for control of operations thereof. The tangible program medium may be a radio wave signal or a computer-readable medium. The radio wave signal refers to a signal artificially generated, such as a machine-generated electrical, optical or electromagnetic signal, which is generated to encode information to be transmitted to a proper receiver device for execution by a computer. The computer-readable medium may be a machine-readable storage device, a machine-readable storage substrate, a memory device, a combination of materials that affect a machine-readable radio wave signal, or at least one combination thereof.

The computer program (also known as program, software, software application, script or code) may be written in any form of programming language, including compiled or interpreted language or a priori or procedural language, and may be deployed in any form including standalone programs, modules, components, subroutines or other units suitable for use in a computer environment.

The computer program may not necessarily correspond to a file on a file device. The program may be stored within a single file provided to the requested program, within multiple interacting files (for example, at least one file that stores portions of module, subprogram, or code), or within a portion of a file having another program or data, (for example, at least one script stored within a markup language document).

The computer program may be deployed to be executed on one computer or multiple computers interconnected by a communication network while either positioned at one site or distributed over a plurality of sites.

Additionally, the logic flow and structural block diagram described herein describe corresponding acts and/or specific methods supported by corresponding functions and steps supported by the disclosed structural means, and may also be used to build corresponding software structures and algorithms and equivalents thereof.

The process and logic flow described herein may be performed by at least one programmable processor that executes at least one computer program so as to be operated on input data and generate an output to perform functions.

The processor suitable for executing the computer program include any at least one processor, for example, a general microprocessor or a special purpose microprocessor of any type of digital computer. In general, the processor may receive instructions and data from either read-only memory or random access memory or both.

A key element of a computer includes at least one memory device for storing instructions and data, and a processor for executing the instructions. In addition, the computer may usually, for example, receive/transmit data from/to at least one mass storage device for storing data, such as a magnetic disc, an optical disc, or a magneto-optical disc, or may be operatively coupled to the mass storage device or include the mass storage device to perform both of the operations. However, the above mass storage device may not be required for the computer.

The description set forth herein suggests the best mode of the invention, and examples are provided to illustrate the present invention and enable those skilled in the art to produce or use the present invention. The specification written in the above manner does not limit the present invention to the presented specific terms.

Although the present invention has been described with reference to exemplary embodiments, it will be understood by those skilled in the art or those having ordinary skill in the art that various modifications and variations of the present invention can be made without departing from the spirit and scope of the present invention as set forth in the appended claims.

Accordingly, the technical scope of the present invention will not be limited to the content described in the detailed description of the specification, but will be defined by the claims and their equivalents.

The invention claimed is:

1. A method of operating a blasting system, the method comprising:
   generating, by a blasting design device, a blasting design including at least one of blasting hole information, explosive information and detonator information, based on a base map for a blasting site;
   forming, by a drilling device, a plurality of blasting holes based on the blasting design, and
   performing, by the blasting design device, the blasting design according to a drilling data generated by the drilling device;
   charging, by a charging device, at least one of an explosive and an electronic detonator into the plurality of blasting holes based on the blasting design, and performing, by the blasting design device, the blasting design according to a charging data generated by the charging device; and
   performing, by a detonator setting device, a detonator setting on a plurality of electronic detonators corresponding to the plurality of blasting holes based on the blasting design, and performing, by the blasting design device, the blasting design according to a setting data generated by the detonator setting device, wherein
   the blasting hole information includes at least one of a position, a depth, a charging amount, and a blasting hole spacing for the plurality of blasting holes, the explosive information includes at least one of an energy density change, a composition ratio, and a specific gravity according to the charging amount, a charging length, a type, and the depth, and the detonator information includes at least one of a type, a position, an initial time, and a delay time of the electronic detonator.

2. The method according to claim 1, further comprising:
surveying, by a surveying device, the blasting site, and generating, by the blasting design device, the base map according to a survey data generated by the surveying device, wherein the generating the base map includes:
generating, by an unmanned aerial vehicle, a first survey data by three-dimensionally surveying the blasting site in an air;
generating, by a radar, a second survey data by three-dimensionally surveying the blasting site on a ground; and
generating, by the blasting design device, the base map, which is a three-dimensional topographical model, based on at least one of the first survey data and the second survey data received from the unmanned aerial vehicle and the radar.

3. The method according to claim 2, wherein the performing the blasting design according to the drilling data by the blasting design device includes:
forming, by a drilling unit, at least one of the plurality of blasting holes according to the blasting hole information;
generating, by a drilling detection unit, the drilling data by detecting at least one of positions, depths, and slopes of the plurality of blasting holes while forming the plurality of blasting holes; and
applying, by a first design complementation unit of the blasting design device the drilling data onto the blasting design.

4. The method according to claim 3, wherein the performing the blasting design according to the charging data by the blasting design device includes:
charging, by a charging unit, at least one of the explosive and the electronic detonator into at least one of the plurality of blasting holes according to the explosive information;
generating, by a charge detection unit, the charging data by detecting at least one of the energy density change, the composition ratio, and the specific gravity according to the charging amount, the charging length, the type, and the depth while charging at least one of the explosive and the electronic detonator; and
applying, by a second design complementation unit of the blasting design device the charging data onto the blasting design.

5. The method according to claim 4, wherein the performing the blasting design according to the setting data by the blasting design device includes:
setting, by a setting unit, the initial time and the delay time for the electronic detonator according to the detonator information;
generating, by a setting detection unit, the setting data by detecting at least one of a position, a type, an identification code, and a detonation energy of the electronic detonator; and
applying, by a third design complementation unit of the blasting design device the setting data onto the blasting design.

6. The method according to claim 5, further comprising:
performing, by a blasting device, blasting according to the blasting design,
wherein the performing of the blasting according to the blasting design by the blasting device includes:
transmitting, by the blasting device, a blasting command to the plurality of electronic detonators according to the detonator information; and
detonating, by the plurality of electronic detonators, according to the blasting command to explode the explosive.

7. The method according to claim 6, further comprising:
monitoring, by a monitoring device, a situation of the blasting site in real time,
wherein the situation of the blasting site includes a position and an operating status of at least one of the surveying device, the drilling device, the charging device and the detonator setting device, or a position and a route of an operator.

8. The method according to claim 7, wherein the monitoring in real time by the monitoring device includes:
monitoring, by a processing unit, an entire blasting process in real time;
providing, by a web providing unit, a monitoring result of the processing unit in real time through a web service; and
storing, by a storage unit, the monitoring result in a cloud server.

9. The method according to claim 7, further comprising:
detecting, by a blasting detection device, a blasting result by detecting at least one of a vibration, a noise and a crushing degree according to the blasting; and
analyzing, by the monitoring device, the blasting result and building a database based on the analyzed result.

10. The method according to claim 9, wherein the detecting the blasting result by the blasting detection device further includes:
generating, by a vibration detection unit, a vibration data by detecting the vibration generated according to the blasting;
generating, by a noise detection unit, a noise data by detecting the noise generated according to the blasting; and
generating, by a crushing degree detection unit, a crushing degree data by detecting a crushing degree of rock according to the blasting, wherein
the crushing degree detection unit photographs a crushed stone using a drone for a topographical production in a unit blasting region after the blasting, and performs a crushing degree analysis by processing an image of the crushed stone as an ortho-image.

11. A blasting design device comprising:
a blasting design unit for generating a blasting design including at least one of blasting hole information, explosive information and detonator information, based on a base map for a blasting site; and
a first design complementation unit for applying a drilling data, generated by a drilling device, onto the blasting design, wherein
the blasting hole information includes at least one of a position, a depth, a charging amount, and a blasting hole spacing for a plurality of blasting holes,
the explosive information includes at least one of an energy density change, a composition ratio, and a specific gravity according to the charging amount, a charging length, a type, and the depth, and the detonator information includes at least one of a type, a position, an initial time, and a delay time of the electronic detonator.

12. The blasting design device according to claim 11, further comprising:
a map generation unit for generating the base map according to a survey data generated by a surveying device surveying the blasting site.

13. The blasting design device according to claim 12, further comprising:
a second design complementation unit for applying a charging data, generated by the charging device, onto the blasting design.

14. The blasting design device according to claim 13, further comprising:
a third design complementation unit for applying a setting data, generated by the detonator setting device, onto the blasting design.

15. A blasting system comprising:
a surveying device for surveying a blasting site to generate a survey data;
a blasting design device for generating a blasting design for the blasting site;
a drilling device for generating a drilling data by forming a plurality of blasting holes based on the blasting design and detecting at least one of positions, depths, and slopes of the plurality of blasting holes while forming the plurality of blasting holes;
a charging device for generating a charging data by charging at least one of an explosive and an electronic detonator into the plurality of blasting holes based on the blasting design, and detecting at least one of an energy density change, a composition ratio, and a specific gravity according to a charging amount, a charging length, a type, and a depth while charging at least one of the explosive and the electronic detonator; and
a detonator setting device for generating a setting data by setting an initial time and a delay time to the electronic detonator based on the blasting design, and detecting at least one of a position, a type, an identification code, and a detonation energy of the electronic detonator,
wherein the blasting design device includes:
a map generation unit for generating a base map according to the survey data;
a blasting design unit for generating the blasting design including at least one of blasting hole information, explosive information and detonator information, based on the base map; and
a first design complementation unit for applying the drilling data, generated by the drilling device, onto the blasting design, wherein
the blasting hole information includes at least one of a position, a depth, a charging amount, and a blasting hole spacing for the plurality of blasting holes,
the explosive information includes at least one of an energy density change, a composition ratio, and a specific gravity according to the charging amount, the charging length, a type, and the depth, and
the detonator information includes at least one of the type, the position, the initial time, and the delay time of the electronic detonator.

16. The blasting system according to claim 15, wherein the blasting design device further includes:
a second design complementation unit for applying the charging data, generated by the charging device, onto the blasting design.

17. The blasting system according to claim 16, wherein the blasting design device further includes:
a third design complementation unit for applying the setting data, generated by the detonator setting device, onto the blasting design.

18. The blasting system according to claim 17, further comprising:
a blasting device for performing blasting according to the blasting design; and
a monitoring device for monitoring a situation of the blasting site in real time,
wherein the situation of the blasting site includes a position and an operating status of at least one of the surveying device, the drilling device, and the charging device, or a position and a route of an operator.

19. The blasting system according to claim 18, wherein the monitoring device includes:
a processing unit for monitoring the entire blasting process in real time;
a web providing unit for providing a monitoring result of the processing unit in real time through a web service; and
a storage unit for storing the monitoring result in a cloud server.

20. The blasting system according to claim 19, wherein the surveying device includes:
an unmanned aerial vehicle for three-dimensionally surveying the blasting site in an air; and
a radar for three-dimensionally surveying the blasting site on a ground.

* * * * *